United States Patent
Armstrong et al.

(10) Patent No.: US 9,377,203 B2
(45) Date of Patent: Jun. 28, 2016

(54) EXPANDING OVEN GASKET FOR AN OVEN APPLIANCE

(71) Applicant: General Electric Company, Schenectady, NY (US)

(72) Inventors: James Lee Armstrong, Louisville, KY (US); Joshua Stephen Wiseman, Elizabethtown, KY (US); Paul Bryan Cadima, Prospect, KY (US)

(73) Assignee: General Electric Company, Schenectady, NY (US)

( * ) Notice: Subject to any disclaimer, the term of this patent is extended or adjusted under 35 U.S.C. 154(b) by 441 days.

(21) Appl. No.: 14/053,697

(22) Filed: Oct. 15, 2013

(65) Prior Publication Data
US 2015/0101586 A1 Apr. 16, 2015

(51) Int. Cl.
*F24C 15/02* (2006.01)
*A21B 3/02* (2006.01)
*F24B 13/00* (2006.01)
*A21C 1/14* (2006.01)

(52) U.S. Cl.
CPC .............. *F24C 15/021* (2013.01); *A21B 3/02* (2013.01); *F24B 13/004* (2013.01); *A21C 1/1485* (2013.01)

(58) Field of Classification Search
CPC .... F24C 15/021; F24B 13/004; F28F 9/0026; F28F 9/165; F28F 9/005; F28F 9/02169; A21B 3/02; A21C 1/1485
USPC ................... 126/190; 49/480.1, 477.1, 475.1; 277/541, 550, 573, 628, 630, 637, 645, 277/646, 644
IPC ................. F24C 15/02; A21B 3/02; A21C 1/14
See application file for complete search history.

(56) References Cited

U.S. PATENT DOCUMENTS

| 2,665,458 | A | * | 1/1954 | Wilcox | F24C 15/021 49/479.1 |
| 2,924,471 | A | * | 2/1960 | Poltorak | B29D 99/0053 277/652 |
| 4,979,280 | A |  | 12/1990 | Weil |  |
| 5,353,695 | A |  | 10/1994 | Ledet |  |
| 5,395,126 | A | * | 3/1995 | Tresslar | F16J 15/022 277/637 |
| 5,737,991 | A | * | 4/1998 | Kite, III | F16J 15/061 49/498.1 |
| 5,918,885 | A | * | 7/1999 | Radke, II | F24C 15/021 24/458 |
| 7,086,649 | B2 | * | 8/2006 | Plona | F01D 5/081 277/399 |
| 8,789,314 | B2 | * | 7/2014 | Alexander | B60J 10/244 49/475.1 |
| 2003/0001344 | A1 | * | 1/2003 | Bono, Jr. | F24C 15/021 277/631 |
| 2004/0026874 | A1 | * | 2/2004 | Flasher | F16J 15/065 277/628 |
| 2004/0070155 | A1 | * | 4/2004 | Bono, Jr. | F16J 15/061 277/630 |

(Continued)

FOREIGN PATENT DOCUMENTS

GB 1584870 A 2/1981
JP 8175733 A 10/1983

*Primary Examiner* — Gregory Huson
*Assistant Examiner* — Daniel E Namay
(74) *Attorney, Agent, or Firm* — Dority & Manning, P.A.

(57) ABSTRACT

An oven gasket is provided for improved sealing between the door and oven body of an oven appliance as the oven is heated. The oven gasket expands when heated so as to help improve sealing. The expansion of the gasket provides additional compression of the gasket and closes gaps that might otherwise form due to expansion of the oven door as the oven heats. The gasket can be effective even at high temperature oven operation such as e.g., during a cleaning cycle.

11 Claims, 5 Drawing Sheets

(56) References Cited

U.S. PATENT DOCUMENTS

| | | | | |
|---|---|---|---|---|
| 2004/0094905 | A1* | 5/2004 | Weil | F16J 15/027 277/628 |
| 2007/0241516 | A1* | 10/2007 | Efremov | F16J 15/0806 277/626 |
| 2011/0079965 | A1* | 4/2011 | Dromain | F16J 15/027 277/630 |
| 2012/0160830 | A1* | 6/2012 | Bronstering | H05B 6/763 219/620 |
| 2012/0286480 | A1* | 11/2012 | Efremov | F16J 15/0806 277/626 |

* cited by examiner

EXPANDING OVEN GASKET FOR AN OVEN APPLIANCE

FIELD OF THE INVENTION

The subject matter of the present disclosure relates generally to a gasket for an oven appliance.

BACKGROUND OF THE INVENTION

A typical oven appliance construction provides at least one heated chamber into which food items may be placed for cooking operations. A door provides for closing the chamber to hold in heat and cooking fumes. The door can be opened to remove food items during and after cooking operations.

In order to provide a seal between the door and the body of the oven appliance, at least one gasket is positioned to close or seal off the gap between the door and the oven body when the door is in a closed position. The gasket provides a gas tight seal to help prevent the escape of heat and cooking gases. Conventional constructions for the gasket include e.g., a metal mesh surrounded by a fabric. The gasket is typically positioned on the door at a position that will surround the opening to the oven chamber when closed or may be placed directly onto the oven body around the opening. Closing of the door provides a slight compression of the gasket to further facilitate sealing.

During operation of the oven appliance, particularly during cleaning cycles or other high temperature operations, the oven door will typically expand as it is heated. With e.g., self-cleaning cycles, the door may be held in the closed position by a latch positioned at the center of the door so as to prevent opening the oven during such periods of high temperature. As the temperature of the door increases during the cycle, the door can expand causing the corners of the door to bow out or move away from the oven. If enough expansion occurs, such bowing of the door can reduce the compression of the gasket leading to a loss of heat and/or gases from the oven. In extreme cases, the door may even bow enough to create cracks or gaps between the oven and door despite the presence of the gasket.

As the gasket ages over time and experiences repeated heat cycling from use, the resiliency and compliance of the gasket may be reduced due to creep. Soiling of the gasket can also occur. These factors can also further decrease the gasket's ability to maintain a compressive seal between the door and oven body.

Accordingly, an oven gasket than can provide improved sealing between the door and oven body of an oven appliance would be useful. An oven gasket that can provide such improved sealing at even the higher temperatures of oven operation such as a cleaning cycle would also be beneficial.

BRIEF DESCRIPTION OF THE INVENTION

The present invention provides an oven gasket that provides improved sealing between the door and oven body of an oven appliance as the oven is heated. More particularly, the present invention provides an oven gasket that will expand when heated so as to help improve sealing. The expansion of the gasket provides additional compression of the gasket and closes gaps that might otherwise form due to expansion of the oven door as the oven heats. The gasket can be effective even at high temperature oven operation such as e.g., during a cleaning cycle. Additional aspects and advantages of the invention will be set forth in part in the following description, or may be apparent from the description, or may be learned through practice of the invention.

In one exemplary embodiment, the present invention provides an oven appliance that includes an oven body defining a cooking chamber for the receipt of food items for cooking. The cooking chamber has an opening for access to the cooking chamber. A door is positioned at the opening. The door is configured for movement between an open position for access to the cooking chamber and a closed position for closing the opening to the cooking chamber. An oven gasket is positioned in a gap between the door and the oven body and surrounds the opening to the cooking chamber when the door is in the closed position. The oven gasket includes an inner layer comprising a shape memory alloy configured to expand with heating so as maintain a seal between the door and the oven body as the door expands from such heating. The inner layer is also configured to contract with cooling. An outer layer is positioned over the inner layer.

In another exemplary embodiment, the present invention provides an oven gasket for positioning between a door and an oven body of an oven appliance. The gasket includes a layer comprising a shape memory alloy configured to expand with heating so as maintain a seal between the door and the oven body as the door expands from such heating. The inner layer is also configured to contract with cooling.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
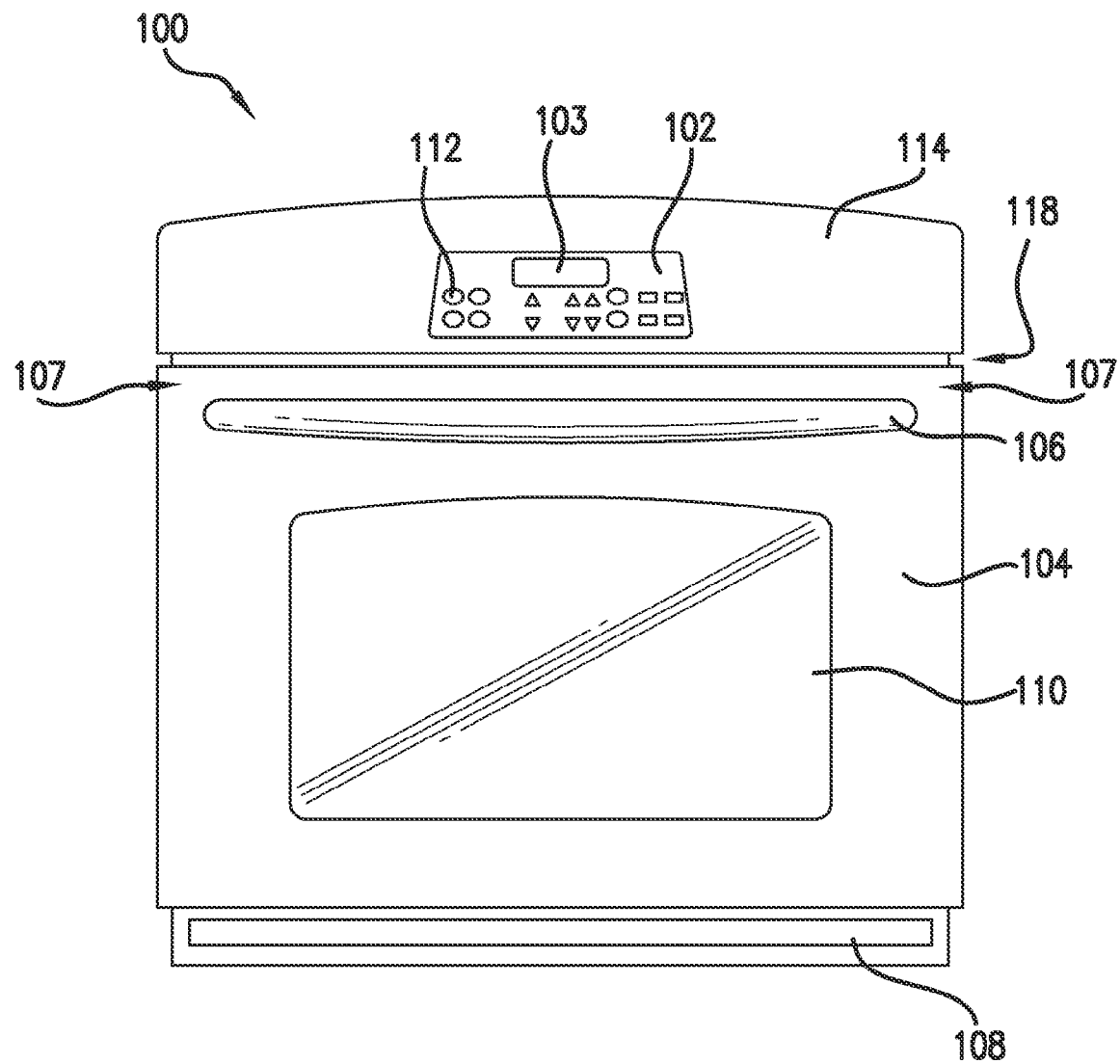
FIG. 1 provides a front view of an exemplary embodiment of an oven appliance of the present invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
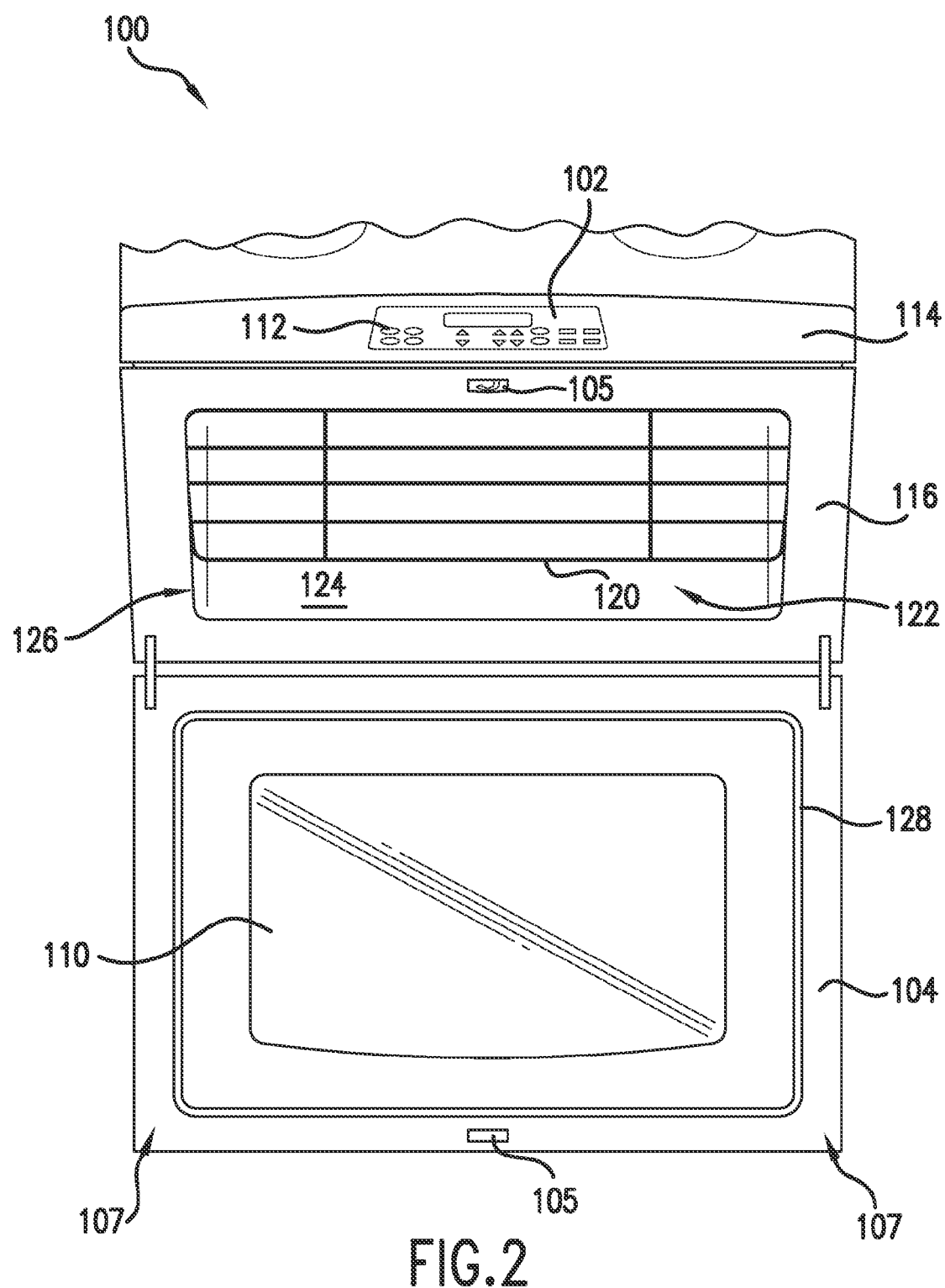
FIG. 2 is a view looking down on the front of the exemplary oven appliance of FIG. 1 with a door shown in an open position.

Referring to FIG. 1, an exemplary embodiment of an oven 100 according to the present invention is shown. FIG. 1 provides a front view of oven 100 while FIG. 2 provides a view looking down on oven 100 with an oven door 104 shown in an open position. Door 104 includes a handle 106 that provides for moving door 104 between an open position for access to a cooking chamber 124 defined by an oven body 116 and a closed position that closes an opening 122 at which door 104 is positioned. For this exemplary embodiment, door 104 is connected by one or more hinges (not shown) to oven body 116 for rotating between the open and closed positions. A latch 105 allows door 104 to be secured to oven body 116 during high temperature operations.

A user of oven appliance 100 can place a variety of different items to be cooked in chamber 124. Oven rack 120 provides for supporting one or more cooking utensils within cooking chamber 124. Rack 120 is adjustable between different vertical levels. A heating element (not shown) at the top, bottom, or both of chamber 124 provides heat for cooking. Such heating element(s) can be gas, electric, microwave, or a combination thereof. A window 110 on door 104 allows the user to view e.g., food items during the cooking process. Vents 108 and 118 provide for a flow of cooling air for door 104.

Oven 100 includes a user interface 102 having a display 103 positioned on a top panel 114 and having a variety of controls 112. Interface 102 allows the user to select various options for the operation of oven 100 including e.g., temperature, time, and/or various cooking and cleaning cycles. Operation of oven appliance 100 can be regulated by a controller (not shown) that is operatively coupled i.e., in communication with, user interface panel 102, heating element 130, and other components of oven 100 as will be further described.

For example, in response to user manipulation of the user interface panel 102, the controller can operate the heating element(s). The controller can receive measurements from a temperature sensor (not shown) placed in cooking chamber 124 and e.g., provide a temperature indication to the user with display 103. The controller can also be provided with other features as will be further described herein.

By way of example, the controller may include a memory and one or more processing devices such as microprocessors, CPUs or the like, such as general or special purpose microprocessors operable to execute programming instructions or micro-control code associated with operation of appliance 100. The memory may represent random access memory such as DRAM, or read only memory such as ROM or FLASH. In one embodiment, the processor executes programming instructions stored in memory. The memory may be a separate component from the processor or may be included onboard within the processor.

The controller may be positioned in a variety of locations throughout appliance 100. In the illustrated embodiment, the controller may be located under or next to the user interface 102 otherwise within top panel 114. In such an embodiment, input/output ("I/O") signals are routed between the controller and various operational components of appliance 100 such as heating element(s), controls 112, display 103, sensor(s), alarms, and/or other components as may be provided. In one embodiment, the user interface panel 102 may represent a general purpose I/O ("GPIO") device or functional block.

Although shown with touch type controls 112, it should be understood that controls 112 and the configuration of appliance 100 shown in FIG. 1 is provided by way of example only. More specifically, user interface 102 may include various input components, such as one or more of a variety of electrical, mechanical or electro-mechanical input devices including rotary dials, push buttons, and touch pads. The user interface 102 may include other display components, such as a digital or analog display device designed to provide operational feedback to a user. The user interface 102 may be in communication with the controller via one or more signal lines or shared communication busses.

Also, oven 100 is shown as a wall oven but the present invention could also be used with other cooking appliances such as e.g., a stand-alone oven, an oven with a stove-top, and other configurations of such ovens as well.

As shown in FIG. 2, oven appliance 100 includes a gasket 128 that provides a seal between door 104 and oven body 116 when door 104 is in a closed position. As such, gasket 128 helps prevent the escape of heat and oven gases during cooking and cleaning operations. Additionally, gasket 128 helps prevent the influx of air from the exterior of oven body 116 into cooking chamber 124 during such operations.

For this exemplary embodiment, oven gasket 128 is attached to door 104 and is positioned so that, when door 104 is in a closed position, gasket 128 will be located around, and outside of, the periphery 126 of the opening 122 to cooking chamber 124. Gasket 128 can be attached to door 104 by a variety of techniques. For example, a plurality of mechanical fasters such e.g., clips can be spaced apart along gasket 126 for connecting to door 104. Although shown connected to door 104, it should be understood that gasket 128 could also be placed onto oven body 116 around periphery 126 as well. Also, while depicted in FIG. 2 as a single continuous strip, gasket 128 can be constructed from one or more pieces having ends that are joined to enclose periphery 126.

Figure 3:
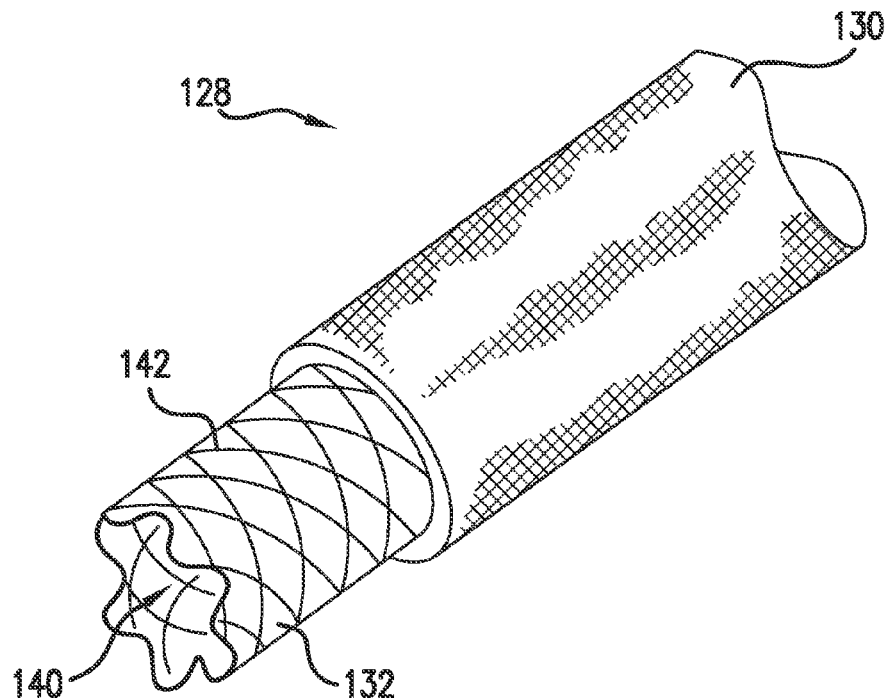
FIG. 3 is a perspective view of a portion of an exemplary embodiment of an oven gasket of the present invention. Portions of the inner layer are exposed for purposes of explanation of this exemplary embodiment.
Figure 4:
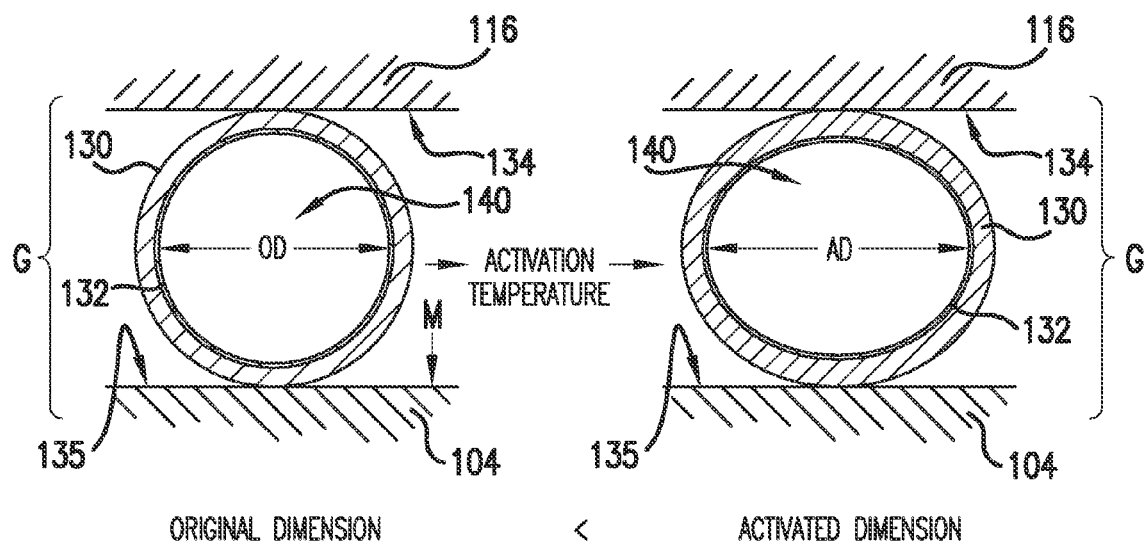
FIG. 4 provides cross-sectional end views of an exemplary embodiment of an oven gasket of the present invention as will be further described below.

Referring now to FIGS. 3 and 4, when door 104 is in a closed position against oven body 116, oven gasket 128 is positioned in a crack or gap G between door 104 and oven body 116. In the closed position, oven gasket 128 is in contact with, and compressed between, surface 134 of oven body 116 and surface 135 of oven door 104. Such compression helps maintain the desired sealing by oven gasket 128.

For a conventionally formed gasket, as door 104 heats up, expansion can cause the door to move along the direction of arrow M, particularly near the corners 107 (FIGS. 1 and 2) of door 104 during high temperature operations. For example, during a cleaning cycle, temperatures inside cooking chamber 124 can approach 800 degrees Fahrenheit or higher—causing expansion and warping of door 104. When such warping causes door 104 to move away (arrow M), a conventional gasket can lose compression or even lose contact with surface 134 so that the desired sealing is no longer obtained.

However, according to an exemplary embodiment of the present invention, gasket 128 includes a shape memory alloy that will expand when heated so as to maintain the proper seal. More particularly, as shown in FIGS. 3 and 4, gasket 128 includes an inner layer 132 and an outer layer 130 that together form a compressible, tube-like shape around inner chamber 140.

Outer layer 130 is positioned over inner layer 132 and can be constructed from a variety of materials. For example, outer layer 130 can be constructed from a fiberglass cloth. Other temperature appropriate materials may be used as well.

The inner layer 132 is constructed from a shape memory alloy. As used herein, the shape memory alloy is a material that can be treated so as to "remember" or return to a particular shape when heated to or above a temperature referred to as an activation temperature. Gasket 128 is constructed from a shape memory alloy that is treated to have an activated dimension AD along its cross-section (FIG. 4) that is larger than its original dimension (OD). More particularly, as gasket 128 is heated to a temperature at or above the activation temperature of the shape memory alloy used to construct the inner layer, gasket 128 attempts to expand from its original dimension (OD) or shape so as to return to its activated dimension (AD) or shape. Such expansion helps maintain compression of gasket 128 and contact with surfaces 134 and 135 so as to maintain a proper seal even during higher temperature operations that cause door 104 to warp. After the oven cools, gasket 128 can contract to substantially its original dimension or shape.

In one exemplary embodiment of the present invention, gasket 128 is constructed from a shape memory alloy having an activation temperature of about 500 degrees Fahrenheit or higher. Other activation temperatures may be used as well.

A variety of shape memory alloys can be used to construct layer 132. For example, the shape memory alloy could comprise a composition of nickel and titanium. In one exemplary embodiment, a shape memory alloy comprising about 55 weight percent of nickel and about 45 weight percent of titanium is used. In another exemplary embodiment, the shape memory alloy could comprise copper, aluminum, and nickel. Other compositions may be used as well.

A variety of constructions may be used for layer 132 having the shape memory alloy. For example, as illustrated in FIG. 3, the layer 132 could be constructed from a mesh 142 of stainless steel and the shape memory alloy. In another embodiment depicted in FIG. 6, layer 132 could be constructed as a spiral coil 146 comprising a shape memory alloy. A steel mesh could also be included. Upon heating to the activation temperature, coil 146 would expand to return to its activated dimension or shape. In still another embodiment shown in FIG. 7, layer 132 could comprise a steel mesh 142 and a shape memory alloy constructed as a series of rings 144 spaced apart along the length of gasket 128. The rings 144 are oriented so that the rings are compressed along their diameter when the door is in a closed position. Such diameter is expanded as the rings 144 are heating above the activation temperature of the shape memory alloy.

Figure 6:
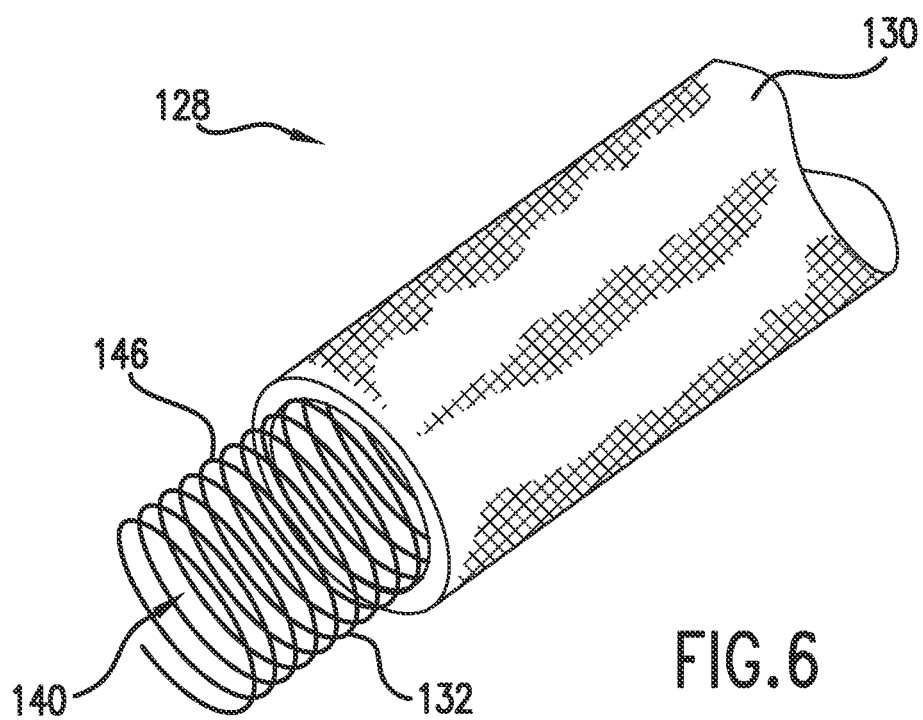
FIGS. 6 and 7 are views of additional exemplary embodiments of an oven gasket of the present invention.
Figure 7:
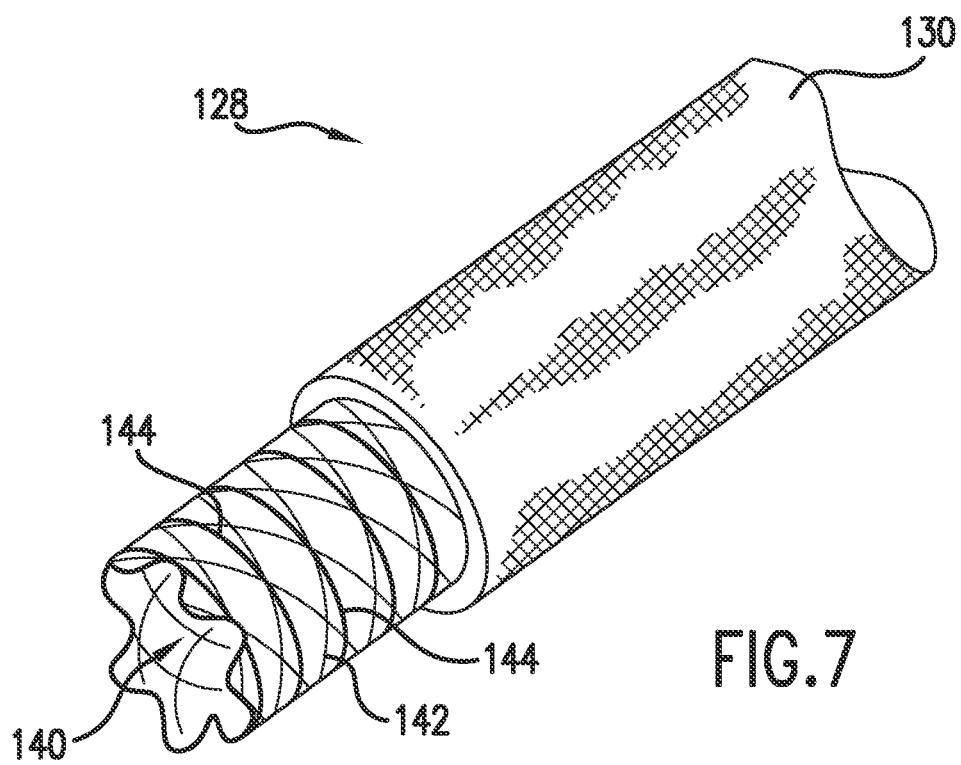

The embodiments depicted in FIGS. 3, 6, and 7 illustrate a two layer gasket where the inner layer 132 includes the shape memory alloy. One of skill in the art will understand that other configurations for gasket 128 having multiple layers (including more than two as shown in the figures) may be used as well. For example, one or more additional layers could be positioned interior of inner layer 132 or exterior to inner layer 132. Furthermore, gasket 128 can have non-circular cross-sectional shapes as well.

Figure 5:
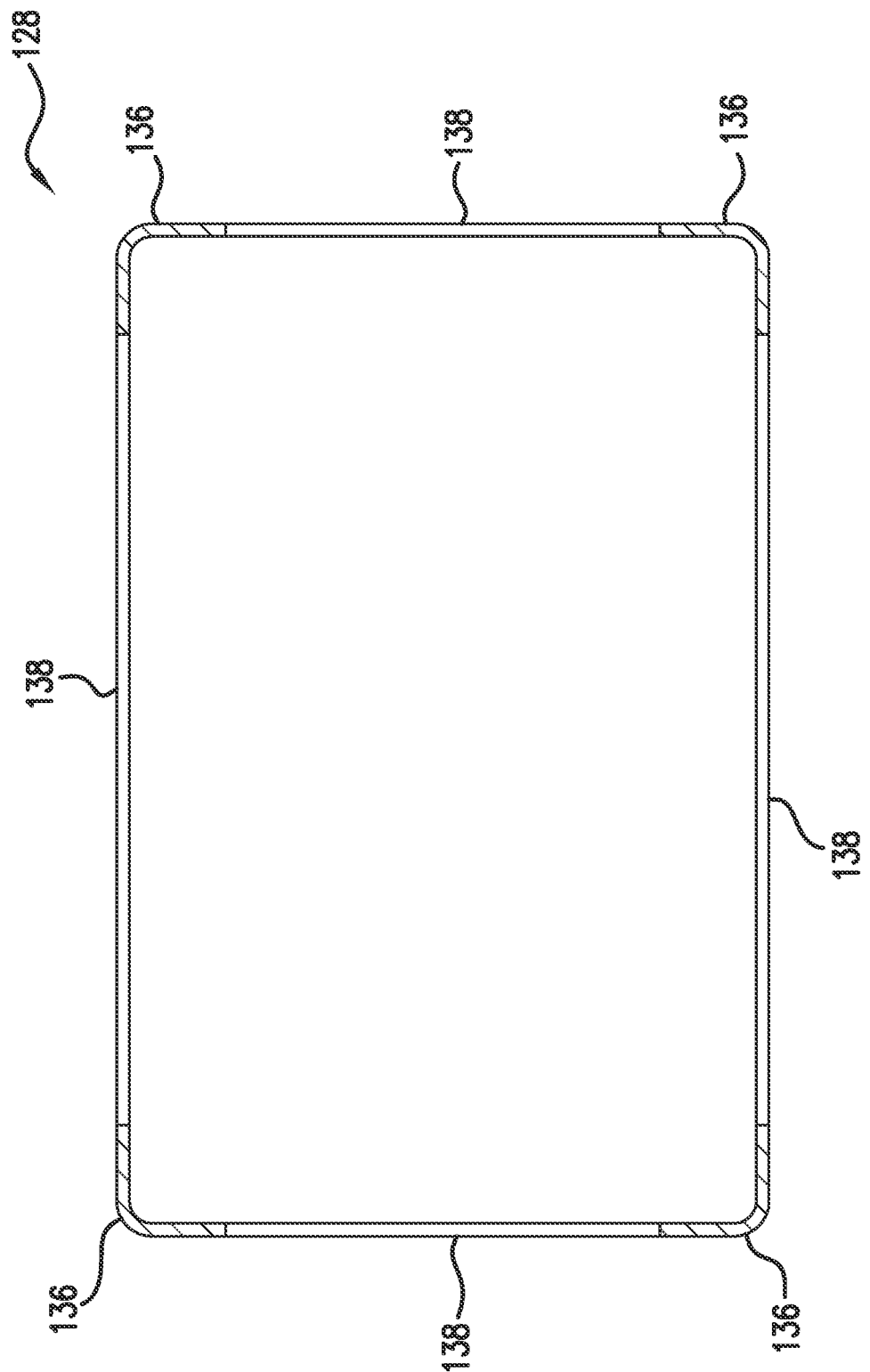
FIG. 5 is a perspective view of an exemplary embodiment of an oven gasket of the present invention.

The shape memory alloy does not have to be included along the entire length of gasket 128. For example, in the exemplary embodiment of FIG. 5, the shape memory alloy has been incorporated into gasket 128 only in those portions where it is anticipated that warping of door 104 during cooking operations could lead to undesirable sealing. Thus, in FIG. 5, gasket 128 is constructed with a shape memory alloy incorporated only at the corner portions 136 of the substantially rectangular-shaped gasket 128. Corner portions 136 are separated from each other by sides 138 that do not include the shape memory alloy. During use, as gasket 128 of FIG. 5 reaches the activation temperature of the shape memory alloy, corner portions 136 will expand to improve sealing at the corners of door 104 where warping is most likely to increase the size of gap G (FIG. 4) and otherwise potentially lead to leaks. Other constructions may be used for gasket 128 as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An oven appliance, comprising:
   an oven body defining a cooking chamber for the receipt of food items for cooking, the cooking chamber having an opening for access to the cooking chamber;
   a door positioned at the opening, the door configured for movement between an open position for access to the cooking chamber and a closed position for closing the opening to the cooking chamber; and
   an oven gasket positioned in a gap between the door and the oven body and surrounding the opening to the cooking chamber when the door is in the closed position, the oven gasket comprising:
      an inner layer comprising a shape memory alloy configured to expand with heating so as maintain a seal between the door and the oven body as the door expands from such heating, the inner layer also configured to contract with cooling; and
      an outer layer positioned over the inner layer.

2. The oven appliance of claim 1, wherein the inner layer has a cross-sectional shape that expands upon heating and contracts upon cooling.

3. The oven appliance of claim 1, wherein the shape memory alloy has an activation temperature, and wherein the shape memory alloy is heat treated to have an expanded shape when at a temperature above the activation temperature and a contracted shape when at a temperature below the activation temperature.

4. The oven appliance of claim 1, wherein the inner layer comprises a mesh of stainless steel and the shape memory alloy.

5. The oven appliance of claim 1, wherein the inner layer comprises a stainless steel mesh and a plurality of rings formed from the shape memory alloy and oriented so that the rings are compressed along a diameter of the rings when the door is in the closed position.

6. The oven appliance of claim 1, wherein the oven gasket is formed in a substantially rectangular shape having four corner portions between four side portions, and wherein the inner layer comprises the shape memory alloy positioned only along the four corner portions that are separated by the four sides.

7. The oven appliance of claim 1, wherein the inner layer comprises a coil of the shape memory alloy.

8. The oven appliance of claim 1, wherein the inner layer comprises a steel mesh and a coil of the shape memory alloy.

9. The oven appliance of claim 1, wherein the shape memory alloy comprises copper, aluminum, and nickel.

10. The oven appliance of claim 1, wherein the shape memory alloy comprises nickel and titanium.

11. The oven appliance of claim 1, wherein the shape memory alloy has an activation temperature of about 500 degrees Fahrenheit or higher.

\* \* \* \* \*